(12) United States Patent
Wang (10) Patent No.: US 9,252,856 B2
(45) Date of Patent: Feb. 2, 2016

(54) METHOD AND APPARATUS FOR RANK OVERRIDE

(71) Applicant: TELEFONAKTIEBOLAGET L M ERICSSON (PUBL), Stockholm (SE)

(72) Inventor: Hai Wang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 151 days.

(21) Appl. No.: 13/988,415

(22) PCT Filed: May 16, 2013

(86) PCT No.: PCT/CN2013/075685
§ 371 (c)(1),
(2) Date: May 20, 2013

(87) PCT Pub. No.: WO2014/183286
PCT Pub. Date: Nov. 20, 2014

(65) Prior Publication Data
US 2014/0341119 A1    Nov. 20, 2014

(51) Int. Cl.
*H04B 7/04* (2006.01)
*H04B 7/06* (2006.01)

(52) U.S. Cl.
CPC .............. *H04B 7/0486* (2013.01); *H04B 7/063* (2013.01)

(58) Field of Classification Search
CPC .................................................. H04W 72/04
USPC ........................................................ 370/329
See application file for complete search history.

(56) References Cited

U.S. PATENT DOCUMENTS

| | | | | |
|---|---|---|---|---|
| 8,064,394 B2 * | 11/2011 | Jongren et al. | ................ | 370/329 |
| 8,295,778 B2 * | 10/2012 | Kotecha et al. | ................ | 455/69 |
| 2009/0262695 A1 * | 10/2009 | Chen et al. | ..................... | 370/329 |
| 2010/0208606 A1 * | 8/2010 | Hoshino | ............... | H04L 1/0026 370/252 |
| 2011/0243017 A1 * | 10/2011 | Prasad et al. | ................... | 370/252 |
| 2011/0249637 A1 * | 10/2011 | Hammarwall et al. | ........ | 370/329 |
| 2012/0033630 A1 | 2/2012 | Chung et al. | | |
| 2012/0147773 A1 * | 6/2012 | Kim et al. | ...................... | 370/252 |
| 2012/0201321 A1 | 8/2012 | Koivisto et al. | | |
| 2013/0094543 A1 * | 4/2013 | Zhang et al. | .................. | 375/219 |
| 2013/0301542 A1 * | 11/2013 | Krishnamurthy | ..... | H04W 52/50 370/329 |
| 2014/0119223 A1 * | 5/2014 | Song | ................... | H04W 72/085 370/252 |
| 2015/0036590 A1 * | 2/2015 | Lahetkangas et al. | ........ | 370/328 |

FOREIGN PATENT DOCUMENTS

| | | | | | |
|---|---|---|---|---|---|
| KR | WO 2009022868 A1 | * | 2/2009 | ........... | H04B 7/0417 |
| WO | 2009022868 A1 | | 2/2009 | | |

OTHER PUBLICATIONS

International Seach Report and Written Opinion issued on Feb. 27, 2014 in PCT application No. PCT/CN2013/075685, 7 pages.

* cited by examiner

*Primary Examiner* — Brandon Renner
*Assistant Examiner* — Deepa Belur
(74) *Attorney, Agent, or Firm* — Rothwell, Figg, Ernst & Manbeck, P.C.

(57) ABSTRACT

Methods and apparatuses for use in a MIMO transmission is provided. The method comprises: receiving a rank reported by a user equipment; determining a rank at least partly based on a transmission block size, TBS, index generated from link adaptation decision; and overriding the reported rank with the determined rank. By utilizing downlink link adaption decision, such as $TBS_{idx}$ and rank to quantify PDSCH radio channel quality, improper RI value can be combated, so that transmission of multiple layers only occurs at high SINR region and single layer transmission happens at low SINR region.

12 Claims, 5 Drawing Sheets

METHOD AND APPARATUS FOR RANK OVERRIDE

CROSS-REFERENCE TO RELATED APPLICATION

This application is a 35 U.S.C. §371 National Phase Entry Application from PCT/CN2013/075685, filed May 16, 2013, and designating the United States, the disclosure of which is incorporated by reference herein.

TECHNICAL FIELD

Embodiments of the present invention generally relate to wireless communication systems, and more particularly to methods, apparatuses, a base station, and a computer program for rank override in a multiple-input multiple-output (MIMO) transmission.

BACKGROUND

This section introduces aspects that may facilitate a better understanding of the invention(s). Accordingly, the statements of this section are to be read in this light and are not to be understood as admissions about what is in the prior art or what is not in the prior art.

In multiple-input multiple-output (MIMO) wireless communication systems, both of the transmitter and the receiver use antenna arrays to provide a rich diversity and a large communication capacity. The downlink transmission process in Long Term Evolution (LTE) and LTE-Advanced (LTE-A) may comprise steps of: generating code words by channel coding and modulating of data from an upper layer; layer mapping of different code words; and precoding the layer mapped data so as to transmit from the antenna array. The number of layers is the degree of freedom of the MIMO channel matrix, which is also referred to the rank of the MIMO system.

A LTE enhanced Node B (eNB) performs downlink and uplink link adaptation so that the data transmission matches with the radio link quality experienced by a user equipment (UE). To be more specific, the eNB dynamically determines the number of layers, or rank, in case MIMO is enabled, as well as selects a Modulation and Coding Scheme (MCS), which includes Transport Block Size (TBS) and modulation scheme.

To facilitate downlink link adaptation in LTE/LTE-A, the UE reports its measured Channel State Information (CSI) to the eNB, such as Channel Quality Indicator (CQI) and Rank Indicator (RI) when MIMO or spatial multiplexing is enabled.

However, CSI is often with errors, i.e., either over-estimated or under-estimated. To cope with errors in the reported CQI, the eNB often adopts outer-loop link adaptation, i.e., adjusting CQI based on received downlink Hybrid Automatic Repeat Request Acknowledgement (HARQ-ACK) feedback from the UE. After CQI adjustment, the selected MCS better reflects the UE experienced radio link quality on Physical Downlink Shared Channel (PDSCH) reception.

In contrast to CQI adjustment, the eNB usually follows RI reported from the UE and determines the rank accordingly in the MIMO transmission. However, like any CSI, RI reported from the UE is often with errors, i.e., over-estimated or under-estimated.

In case of un-shifted Cell specific Reference Symbol (CRS) configuration in a LTE network deployment, the reception of CRS at UE side is interfered by all neighbouring cells, while PDSCH reception does not always experience the same interference since the interference level depends on the load situation in neighbouring cells. For example, in an un-loaded network with un-shifted CRS configuration, based on measured CRS quality UE under-estimates the radio link quality on PDSCH reception and reports more RI=1 than it should do. Consequently, the eNB only schedules rank 1 transmission even though the radio condition allows rank 2 transmission for PDSCH, i.e., radio spectrum is under-utilized and user throughput is lower than what it can be achieved. The miss-match between CRS quality and PDSCH quality could also happen in TM8 (Transmission Mode 8, dual-layer beam-forming in TD-LTE) transmission, where CSI report based on CRS does not grasp the beam forming effect on PDSCH. Another factor causing the improper rank is the estimation error of the rank in the UE or the impairments in UE implementation.

On the other hand, field tests revealed that sometimes TM3 (Transmission Mode 3, open-loop MIMO) transmission with rank adaptation is worse than single-stream transmission at low to medium signal to interference and noise ratio (SINR). It is suspected that worse MIMO performance is probably caused by wrongly reported RI, i.e., RI=1 should have been reported instead of RI=2.

In "Downlink Transmission Mode Selection And Switching Algorithm For LTE", Shubhodeep Adhikari, LTE Systems Engineering Group, Motorola Networks, Bangalore, India, Third International Conference on Communication Systems and Networks (COMSNETS), 2011, it is disclosed that making MIMO transmission mode selection at the eNB based solely on mobile feedback can result in significant throughput loss, and an algorithm is described which can prevent such throughput reduction. The algorithm works by enabling the eNB to selectively override the mobile's channel feedback and make a better choice of transmission mode.

In PCT patent application WO2012044236, a mechanism that may be used as a tool for the sending node or eNB to perform rank override of the UE or receiving node feedback reporting is provided. Specifically, by setting a very high Power Measurement Offsets (PMO) value or scaling factor for a certain rank, the receiving node or UE can be made to always report only that rank.

SUMMARY

Thus, one aim of the present invention is to provide solutions to eliminate the errors in reported RI when an eNB determines the number of layers, i.e., rank, in MIMO transmission.

To better address the above concern, in a first aspect of the invention, a method for use in a MIMO transmission is provided. The method comprises: receiving a rank reported by a user equipment; determining a rank at least partly based on a transmission block size, TBS, index generated from link adaptation decision; and overriding the reported rank with the determined rank.

In some embodiments, determining the rank may comprise: calculating a channel quality metric, CQM, for a current sub-frame, at least partly based on the TBS index, the CQM indicating an equivalent channel quality as if in rank 1 transmission; updating a CQM of the MIMO transmission with the calculated CQM; and determining the rank based on the updated CQM.

In some embodiments, determining the rank based on the updated CQM may comprise: determining the rank as a higher rank than a present one if the updated CQM is higher than a first threshold; and determining the rank as a lower rank than the present one if the updated CQM is lower than a second threshold.

In some embodiments, determining the rank based on the updated CQM may further comprise: determining whether a predefined time period has expired before changing the rank.

In some embodiments, calculating the CQM for the current sub-frame is further based on an inter-layer interference factor when the MIMO transmission is scheduled with a rank of more than 1.

In further embodiments, the method may further comprise: accumulating CQM variation during the overriding of the rank; and adjusting the inter-layer interference factor, the first threshold, and the second threshold based on the accumulated CQM variation.

In yet further embodiments, the method may further comprise: overriding a reported channel quality indicator and a reported precoding matrix indicator depending on a transmission mode in operation.

In a second aspect of the invention, an apparatus for use in a MIMO transmission is provided. The apparatus comprises: a receiving unit, configured for receiving a rank reported by a user equipment; a determination unit, configured for determining a rank at least partly based on a transmission block size, TBS, index generated from link adaption decision; and an overriding unit, configured for overriding the reported rank with the determined rank.

In a third aspect of the invention, an apparatus is provided, which comprises at least one processor and at least one memory including computer program code. The memory and the computer program code are configured to cause the apparatus to perform embodiments of the method of the first aspect of the invention.

In a fourth aspect of the invention, a computer-readable storage medium having computer program code stored thereon is provided. The computer program code is configured to, when executed, cause an apparatus to perform actions in the method of the first aspect of the invention.

With particular embodiments of the techniques described in this specification, a new function is suggested for eNB to override RI reported from UE. By utilizing downlink link adaption decision, such as $TBS_{idx}$ and rank to quantify PDSCH radio channel quality, improper RI value can be combated, so that transmission of multiple layers only occurs at high SINR region and single layer transmission happens at low SINR region. In some further embodiments, by introducing hysteresis and/or a timer, over-frequent or ping-pong switching in rank determination may be combated, so that the transmission of the same number of layers lasts for a consecutive time period and outer-loop link adaptation converges during this time period.

Other features and advantages of the embodiments of the present invention will also be understood from the following description of specific embodiments when read in conjunction with the accompanying drawings, which illustrate, by way of example, the principles of embodiments of the present invention.

BRIEF DESCRIPTION OF THE DRAWINGS

The above and other aspects, features, and benefits of various embodiments of the invention will become more fully apparent, by way of example, from the following detailed description and the accompanying drawings, in which.

Like reference numbers and designations in the various drawings indicate like elements.

DETAILED DESCRIPTION OF EMBODIMENTS

Hereinafter, the principle and spirit of the present invention will be described with reference to the illustrative embodiments. It should be understood, all these embodiments are given merely for the skilled in the art to better understand and further practice the present invention, but not for limiting the scope of the present invention. For example, features illustrated or described as part of one embodiment may be used with another embodiment to yield still a further embodiment. In the interest of clarity, not all features of an actual implementation are described in this specification.

While it is described below in the context of a LTE type cellular network for illustrative purposes and since it happens to be well suited to that context, those skilled in the art will recognize that the invention disclosed herein can also be applied to various other types of cellular networks, such as Global System for Mobile Communication (GSM), Wideband CDMA (WCDMA), CDMA2000, Wireless Fidelity (WiFi), Worldwide Interoperability for Microwave Access (WiMAX), etc.

In the following description, a base station (BS) is an entity for conducting downlink transmission to a terminal and can be any of an enhanced Node B (eNB), a Node B, a BS, a radio access unit, a base station controller, and a node on a network. The terminal can be a user equipment (UE), a mobile station (MS), a cellular phone, a smart phone, a computer, or a multimedia system equipped with communication function.

Figure 1:
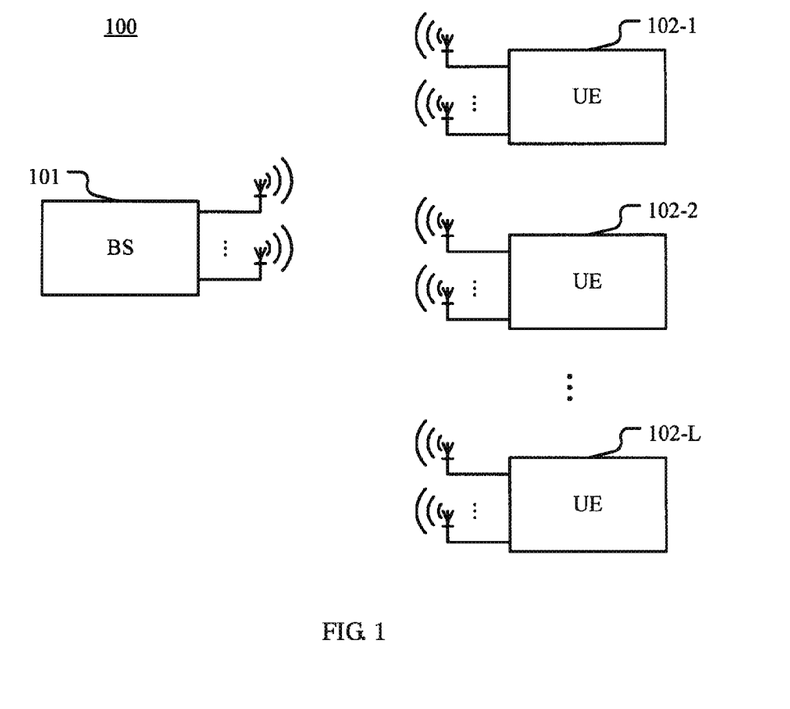
FIG. 1 illustrates an example of wireless communication system environment in which embodiments of the present invention may be implemented.

FIG. 1 illustrates an example of wireless communication system environment 100 in which embodiments of the present invention may be implemented.

As shown in FIG. 1, the wireless communication system environment 100 may include a base station (BS) 101 and several user equipments (UE) 102-1, 102-2, . . . 102-L, wherein L is an integer greater than or equaling to 1. BS 101 has M antennas, and each UE 102-1, 102-2, . . . 102-L has N antennas, wherein M and N are both greater than 1. In various embodiments, BS 101 is also referred to eNB in LTE and LTE-A systems. In the following, embodiments are described with an eNB and a UE for illustration.

Figure 2:
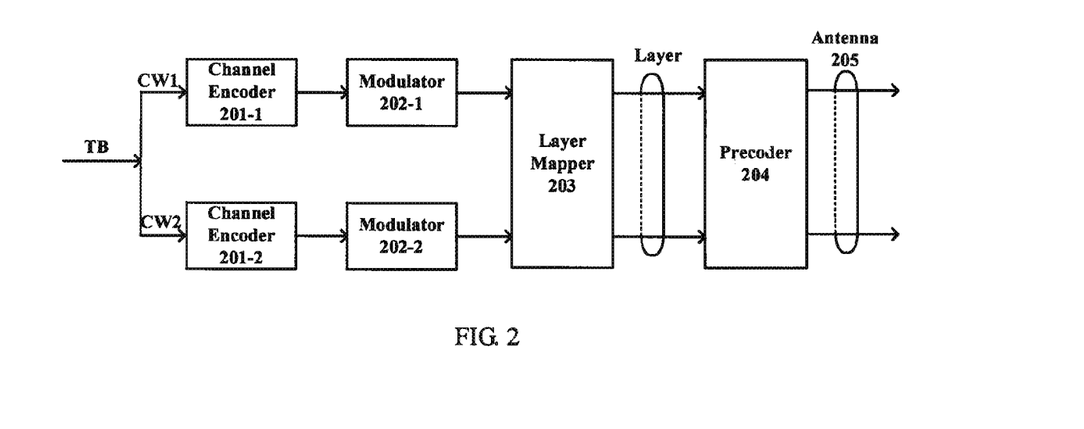
FIG. 2 illustrates an exemplary downlink transmission process in an eNB.

FIG. 2 illustrates an exemplary downlink transmission process in an eNB.

As shown in FIG. 2, a transmission block (TB) is divided into a plurality of code words. Only two code words (i.e., CW1 and CW2) are illustrated in FIG. 2. However, the skilled in the art could appreciate that there may be the TB may be divided into more code words.

Each code word has its individual independent channel coding and modulation. For example, CW1 is channel encoded via a channel encoder 201-1, and then modulated via a modulator 202-1. Similarly, CW2 is channel encoded via a channel encoder 201-2 and modulated via a modulator 202-2.

The resulted data are then mapped to spatial layers in a layer mapper 203. The layer mapped data are then mapped to different antennas 205, i.e, the physical transmission antennas, via a precoder matrix 204.

The skilled in the art should appreciate that, the above diagram is only for illustration, and there may be some other processing steps. For example, rate matching and scrambling may be added after the channel coding, and resource element (RE) mapping and OFDM signal generation may be added after the precoding.

To facilitate downlink link adaptation in LTE/LTE-A, the UE reports its measured Channel State Information (CSI) to the eNB, such as Channel Quality Indicator (CQI) and Rank Indicator (RI) when MIMO or spatial multiplexing is enabled. The eNB dynamically determines the number of layers, or rank, in case MIMO is enabled, as well as selects a Modulation and Coding Scheme (MCS), which includes Transport Block Size (TBS) and modulation scheme.

Figure 3:
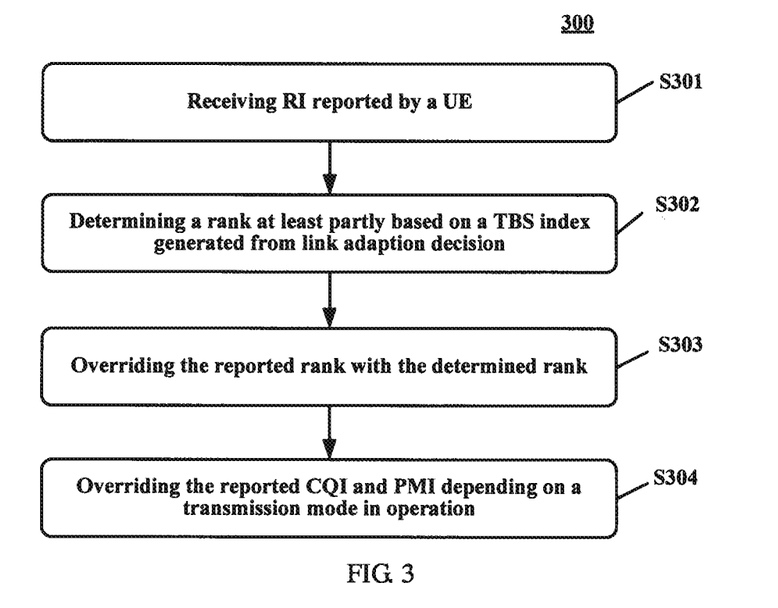
FIG. 3 illustrates an exemplary flow chart of a method for rank override according to embodiments of the present invention.

FIG. 3 illustrates an exemplary flow chart of a method for rank override in a MIMO transmission according to embodiments of the present invention.

As shown in FIG. 3, at step S301, an eNB receives a rank reported by a UE. The reported rank can be indicated by a Rank Indicator (RI). Normally, the eNB also receives CQI and/or PMI from the UE.

Then, at step S302, the eNB determines a rank at least partly based on a TBS index generated from link adaption decision. As mentioned previously, to cope with errors in reported CQI, the eNB often adopts outer-loop link adaptation, i.e., adjusting CQI based on received downlink HARQ-ACK feedback from UE. After CQI adjustment, the selected MCS, including TBS and modulation scheme, better reflects the UE experienced radio link quality on downlink transmission.

Figure 4:
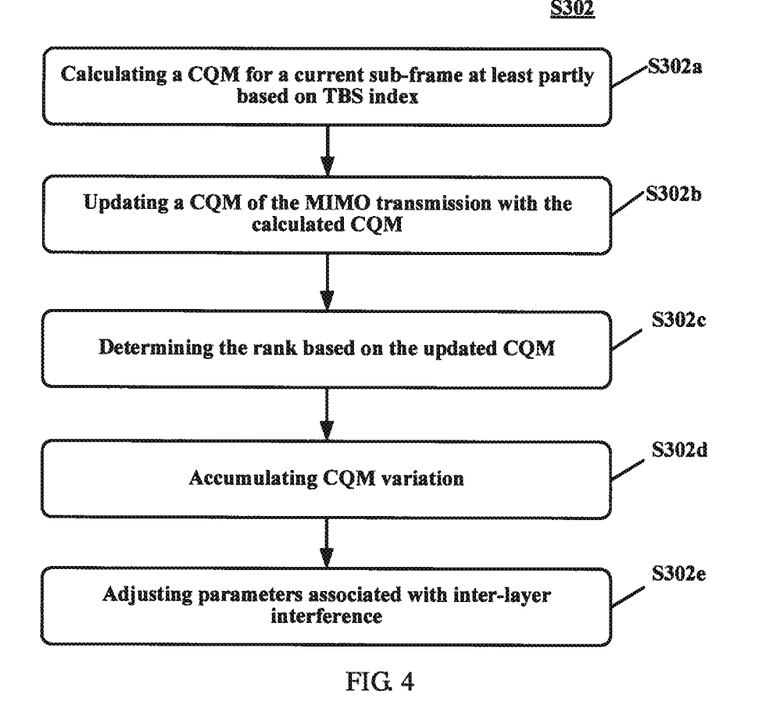
FIG. 4 illustrates an exemplary flow chart of a step for determining a rank according to embodiments of the present invention.

Link level investigations, including simulations, link-to-system modeling, etc., show that, if omitting small errors and quantization/ceiling/flooring, the below rough mappings can be obtained:

$$TBS_{idx} = SINR_{db} + 6 = (10 \cdot \log_{10} SINR) + 6$$

$$CQI = SINR_{db}/2 + 5 = (10 \cdot \log_{10} SINR)/2 + 5$$

where SINR is the effective PDSCH quality on each layer, and $TBS_{idx}$ is the corresponding transport block size index on each layer. PDSCH SINR is not explicitly available at eNB, while $TBS_{idx}$ and CQI are. Thus, in embodiments of the present invention, the TBS is reused for rank determination at the eNB. The detailed description about step S302 will be described with reference to FIG. 4.

Finally, at step S303, the eNB overrides the rank reported by the UE with the rank determined at step S302.

In some further embodiments, at an optional step S304, the CQI and PMI reported by the UE can be overridden depending on a transmission mode in operation. Detailed description thereof will be given with reference to FIG. 6.

In the following description, a MIMO transmission with at most two layers (i.e., rank 2) is described for illustration. However, the skilled in the art could understand that, embodiments of the present invention may be applied similarly to MIMO transmissions with more than two layers.

FIG. 4 illustrates an exemplary flow chart of the step S302 for determining a rank in FIG. 3 according to embodiments of the present invention.

As shown in FIG. 4, at step S302a, a channel quality metric (CQM) for a current sub-frame is calculated at least partly based on the TBS index generated from link adaption decision. The CQM indicates an equivalent channel quality as if in rank 1 transmission. In this way, different channel qualities can be compared with the same metric.

In one embodiment, the CQM, denoted by α, is the equivalent SINR in the decibel scale as if in rank 1 transmission. Then, based on the previous discovered mapping, the CQM can be calculated as:

If UE is scheduled with rank 1, $$\alpha = (TBS_{idx} - 6)$$

If UE is scheduled with rank 2, $$\alpha = (10 \cdot \log_{10}(10^{TBSidx1/10} + 10^{TBSidx2/10}) - 6) + \mu,$$

where $TBS_{idx1}$ is the transport block size index for layer 1, $TBS_{idx2}$ is the transport block size index for layer 2, and μ is a parameter quantifying the inter-layer interference level. In most cases, μ=3 seems a good match with field measurements. In some further embodiments, the value of μ could be updated on-the-fly as discussed later with reference to step S302e in FIG. 4.

Having calculated the CQM for the current sub-frame, at step S302b, a CQM of the downlink transmission can be updated with the calculated CQM.

If a new MIMO transmission is scheduled in the current sub-frame, i.e., a new α is available, then $$\alpha(n) = (1-\lambda)^*\alpha(n-1) + \lambda^*\alpha;$$

otherwise, $$\alpha(n) = \alpha(n-1).$$

In the above expression, λ is a forgetting factor and 0<λ≤1. The value of λ may depend on the velocity of the movement of the UE, the changing speed of the physical transmission channel, and other factors. In one embodiment, λ=0.5. If turning off the sliding average, λ=1.

The updated CQM may be stored periodically for each sub-frame. In some further embodiments, the difference of stored CQM between two consecutive sub-frames is calculated, which may be expressed as:

$$\delta(n) = \alpha(n) - \alpha(n-1).$$

Apparently, when there is no new MIMO transmission scheduled in the current sub-frame (i.e., α(n)=α(n−1)), then δ(n)=0. The difference may be used to monitor the effect of the rank override at the eNB, which will be described at step S302d-S302e.

Then, at step S302c, in each sub-frame, the eNB determines the rank based on the updated CQM. In some embodiments, hysteresis and/or a timer are introduced to prevent over-frequent or ping-pong switching in rank determination. For example, two thresholds may be used to determine the rank by comparing with the updated CQM. Specifically, if the updated CQM is higher than a first threshold, the rank is determined as a higher rank than a present one, and if the updated CQM is lower than a second threshold, the rank is determined as a lower rank than the present one.

Additionally or alternatively, before changing the rank (i.e., determining as a higher one or a lower one), the eNB determines whether a predefined time period has expired. If the time period has expired, then the eNB changes the rank; otherwise, the eNB would not change the rank.

Figure 5:
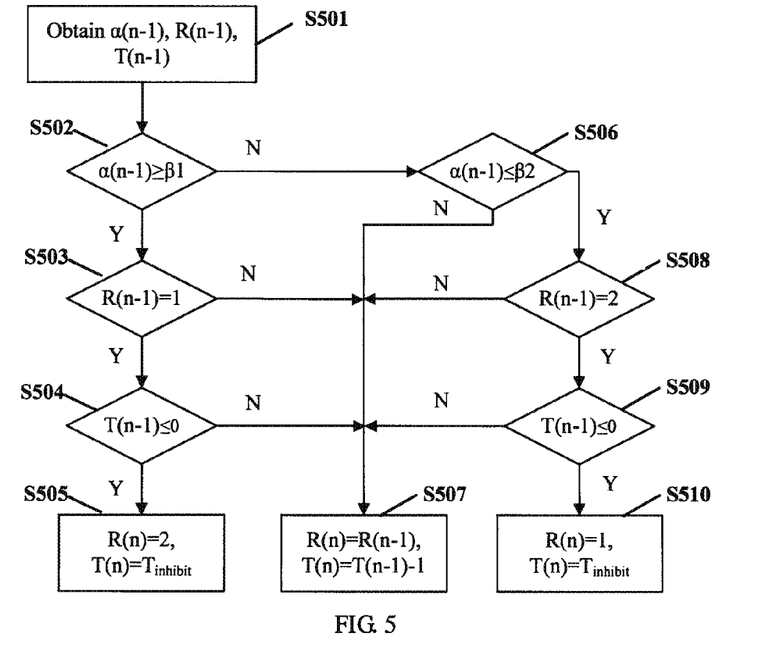
FIG. 5 illustrates an exemplary logic flow for determining the rank based on an updated CQM according to embodiments of the present invention.

Now referring to FIG. 5, which illustrates an exemplary logic flow of the step S302c for determining the rank based on the updated CQM according to one embodiment of the present invention. In this embodiment, two thresholds, an upper threshold β1 and a lower threshold β2, and a timer T, e.g., a countdown counter, are introduced to prevent over-frequent switching in rank determination. $T_{inhibit}$ denotes a predefined time period which should elapse before changing the rank. In some embodiments, $T_{inhibit}$=200. If turning off the timer, $T_{inhibit}$=0.

At step S501, the updated CQM α(n−1), and the rank R(n−1) and the timer or counter T(n−1) for the previous sub-frame n−1 may be obtained, e.g., retrieved from a storage device. It can be understood that, the updated CQM for the previous sub-frame is used to determine the rank for the current sub-frame, while the updated CQM for the current sub-frame is used to determine the rank for the next sub-frame, because updated CQM for the current sub-frame can only be available after downlink link adaptation is done, which is after rank determination in the current sub-frame.

Then, at step S502, the eNB determines whether the updated CQM α(n−1) is greater than or equals to the upper threshold β1. If yes, which means the channel quality is good enough, then the flow goes to step S503.

At step S503, it is determined whether the previous rank R(n−1) equals to 1. If yes, which means a change of rank may be needed, then the flow goes to step S504. Otherwise, the flow goes to step S507, where no change of rank is needed, i.e., R(n)=R(n−1), and the timer is counted down by 1, i.e., T(n)=T(n−1)−1.

At step S504, it is further determined whether the timer has expired, e.g., whether T(n−1) is smaller than or equals to 0. If yes, then at step S505, the rank R(n) for the current sub-frame n is determined as a higher one, i.e., 2 in this embodiment. Further, the timer T(n) is reset to its initial value $T_{inhibit}$. Otherwise, the flow goes to step S507, where the rank is prevented from changing, i.e., R(n)=R(n−1), and the timer is discounted by 1, i.e., T(n)=T(n−1)−1.

Return to step S502. If the decision is no, the flow goes to step S506, at which it is determined whether the updated CQM α(n−1) is lower than or equals to the lower threshold β2. If yes, which means the channel quality is poor enough, then the flow goes to step S508. Otherwise, that is, α(n−1) is greater than β2 but smaller than β1, the flow goes to step S507, where no change of rank is needed.

At step S508, it is determined whether the previous rank R(n−1) equals to 2. If yes, which means a change of rank may be needed, then the flow goes to step S509. Otherwise, the flow goes to step S507, where no change of rank is needed, i.e., R(n)=R(n−1), and the timer is discounted by 1, i.e., T(n)=T(n−1)−1.

At step S509, it is further determined whether the timer has expired, e.g., whether T(n−1) is smaller than or equals to 0. If yes, then at step S510, the rank R(n) for the current sub-frame n is determined as a lower one, i.e., 1 in this embodiment. Further, the timer T(n) is reset to its initial value $T_{inhibit}$. Otherwise, the flow goes to step S507, where the rank is prevented from changing, i.e., R(n−1)=R(n), and the timer is discounted by 1, i.e., T(n)=T(n−1)−1.

Figure 6:
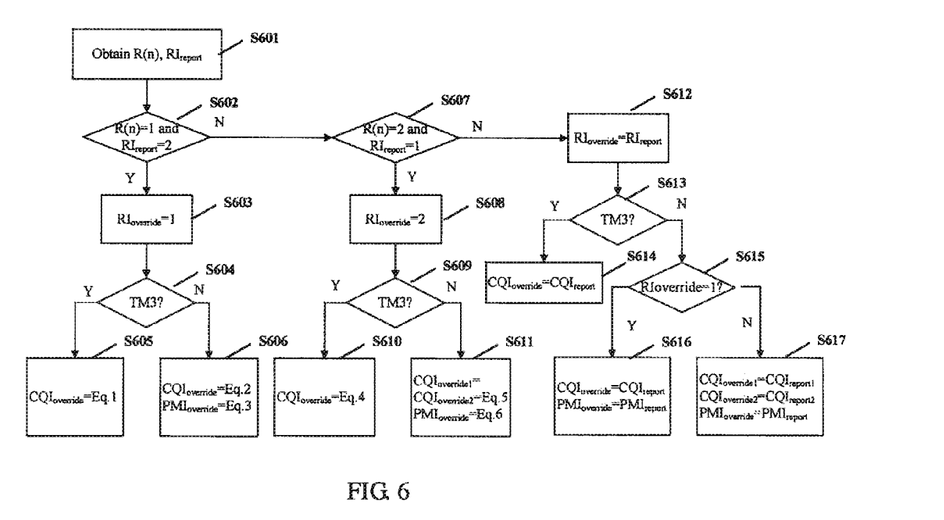
FIG. 6 illustrates an exemplary logic flow for overriding reported RI, CQI and PMI according to embodiments of the present invention.

Having determined the rank R(n) from the updated CQM α(n−1), the eNB can then override the reported rank with the determined rank R(n). FIG. 6 illustrates an exemplary logic flow for overriding the reported RI, CQI and PMI according to embodiments of the present invention.

At step S601, the determined rank R(n) for the current sub-frame n and the rank $RI_{report}$ reported by the UE may be obtained.

Then, at step S602, it is determined whether R(n) equals to 1 and $RI_{report}$ equals to 2. If yes, which means the channel quality is over-estimated by the UE, then the flow goes to step S603, where the rank is overridden by the determined rank R(n), i.e., $RI_{override}$=1.

Return to step S602. If the decision is negative, the flow goes to step S607, where it is further determined whether R(n) equals to 2 and $RI_{report}$ equals to 1. If yes, which means the channel quality is under-estimated by the UE, then the flow goes to step S608. At step S608, the rank is overridden by the determined rank R(n), i.e., $RI_{override}$=2.

Return to step S607. If the decision is negative, which means the rank determined by the eNB equals to the rank (either 1 or 2) reported by the UE, then at step S612, the $RI_{override}$ equals to $RI_{report}$.

In some further embodiments, the reported CQI and PMI can be overridden depending on the transmission mode in operation.

In LTE, different multi-antenna transmission modes have been defined for PDSCH, such as Transmission Mode (TM) 1 (single-antenna port), TM2 (transmit diversity), TM3 (open-loop spatial multiplexing), TM4 (closed-loop spatial multiplexing), TM7 (single-layer beamforming), TM8 (dual-layer beam-forming), etc. In particular, TM3 is rank-adaptive transmission including a mode of transmit diversity with rank 1 and a mode of large delay cyclic delay diversity (CDD) precoding with rank 2. TM7 is single-layer beamforming on the basis of antenna port 5 and supported in LTE Rel-8.

Again, referring to FIG. 6, start from step S603, i.e., $RI_{report}$=2 and $RI_{override}$=1. At step S604, it is determined whether the transmission mode in operation is TM3. If the transmission mode is TM3, then at step S605, the reported CQI can be overridden according to equation 1 shown as blow:

$$CQI_{override} = \min\{\lfloor CQI_{report} + (3+\mu)/2 \rfloor, 15\} \quad \text{(Eq. 1)}$$

Otherwise (i.e., TM4 or TM8 in operation), at step S606, the reported CQI can be overridden according to equation 2, and the reported PMI can be overridden according to equation 3:

$$CQI_{override} = \min\{\lfloor 10 \cdot \log_{10}(10^{2 \cdot CQIreport1/10} + 10^{2 \cdot CQIreport2/10}) + \mu \rfloor/2 \rfloor, 15\} \quad \text{(Eq. 2)}$$

$$PMI_{override} = \begin{cases} 0, & \text{if } PMI_{report} = 1 \text{ and } CQI_{report1} \geq CQI_{report2} \\ 1, & \text{if } PMI_{report} = 1 \text{ and } CQI_{report1} < CQI_{report2} \\ 2, & \text{if } PMI_{report} = 2 \text{ and } CQI_{report1} \geq CQI_{report2} \\ 3, & \text{if } PMI_{report} = 2 \text{ and } CQI_{report1} < CQI_{report2} \end{cases} \quad \text{(Eq. 3)}$$

Where $CQI_{report1}$ is the reported CQI for layer 1 and $CQI_{report2}$ is the reported CQI for layer 2.

Start from step S608, i.e., $RI_{report}$=1 and $RI_{override}$=2. At step S609, it is determined whether the transmission mode in operation is TM3. If the transmission mode is TM3, then at step S610, the reported CQI can be overridden according to equation 4 shown as blow:

$$CQI_{override} = \max\{\lfloor CQI_{report} - (3+\mu)/2 \rfloor, 0\} \quad \text{(Eq. 4)}$$

Otherwise (i.e., TM4 or TM8 in operation), at step S611, the reported CQI can be overridden according to equation 5, and the reported PMI can be overridden according to equation 6:

$$CQI_{override1} = CQI_{override2} = \max\{\lfloor CQI_{report} - (3+\mu)/2 \rfloor, 0\} \quad \text{(Eq. 5)}$$

$$PMI_{override} = \begin{cases} 1, & \text{if } PMI_{report} = 0 \text{ or } 1 \\ 2, & \text{if } PMI_{report} = 2 \text{ or } 3 \end{cases} \quad \text{(Eq. 6)}$$

Where $CQI_{override1}$ is the overridden CQI for layer 1 and $CQI_{override2}$ is the overridden CQI for layer 2.

Start from step S612, i.e., $RI_{override}=RI_{report}$. For this case, the rank reported by the UE is consistent with the rank determined by the eNB, and thus the CQI and the PMI can be kept as the reported ones.

Specifically, at step S613, it is determined whether the transmission mode in operation is TM3. If the transmission mode is TM3, then at step S614, the overridden CQI equals to the reported CQI, i.e., $CQI_{override}=CQI_{report}$. Otherwise (i.e., TM4 or TM8 in operation), at step S615, it is further determined whether the overridden rank $RI_{override}$ is 1.

If $RI_{override}=1$, then at step S616, the overridden CQI equals to the reported CQI, and the overridden PMI equals to the reported PMI, i.e., $CQI_{override}=CQI_{report}$ and $PMI_{override}=PMI_{report}$. Otherwise, i.e., $RI_{override}=2$, then at step S617, $CQI_{override1}=CQI_{report1}$, $CQI_{override2}=CQI_{report2}$, and $PMI_{override}=PMI_{report}$.

The above thus has described the overriding of the reported RI, CQI, and PMI. The skilled in the art should appreciate that, the equations about the overridden CQI are derived from the mapping between CQI and SINR (or $SINR_{db}$) as introduced at the beginning, according to the transmission mode in operation. The detailed process for inference is omitted here for simplification.

Returning to FIG. 4, in some embodiments, the effect of rank override is closely monitored. Specifically, at step S302d, a CQM variation, denoted by $\rho(n)$, is accumulated during the period of rank override. As described with respect to step S302b, the difference of stored CQM between two consecutive sub-frames is calculated, i.e., $\delta(n)=\alpha(n)-\alpha(n-1)$. Then, the CQM variation $\rho(n)$ may be calculated as below:

```
if R(n)=1 and RI_report=2
    ρ(n) = ρ(n−1) + δ(n)
if R(n)=2 and RI_report=1
    ρ(n) = ρ(n−1) − δ(n)
otherwise
    ρ(n) = 0.
```

The CQM variation is caused due to the parameter $\mu$ quantifying the inter-layer interference. The value of $\rho(n)$ should be around 0 if parameters associated with inter-layer interference are selected properly.

Thus, at step S302e, if needed, the eNB adjusts the parameters associated with inter-layer interference, e.g., the inter-layer interference factor $\mu$, the first/upper threshold $\beta1$ and the second/lower threshold $\beta2$, based on the accumulated CQM variation $\rho(n)$.

Specifically, if $\rho(n)$ is too big, which means the inter-layer interference is under-estimated, then the inter-layer interference factor $\mu$ can be increased. On the contrary, if $\rho(n)$ is too small, which means the inter-layer interference is over-estimated, then the inter-layer interference factor $\mu$ can be decreased. Through this way, the inter-layer interference can converge to a correct value.

Figure 7:
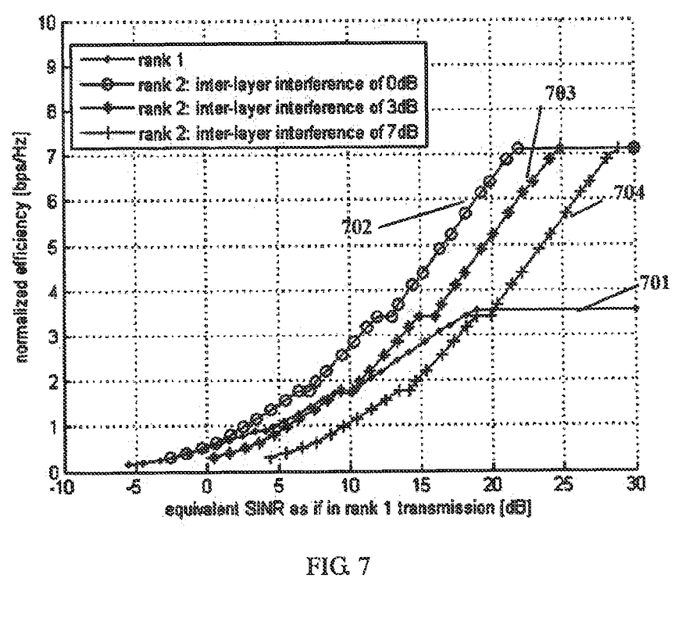
FIG. 7 is a simulation graph illustrating normalized efficiency vs. CQM for rank 1 transmission and rank 2 transmission with different levels of inter-layer interference.

For illustration, several sets of parameters associated with inter-layer interference are suggested based on simulation results. FIG. 7 is a simulation graph illustrating normalized efficiency vs. equivalent SINR as if in rank 1 transmission (i.e., CQM $\alpha$) for rank 1 transmission and rank 2 transmissions with different levels of inter-layer interference assuming TM3 and Control format indicator CFI=3.

As shown in FIG. 7, the horizontal axis represents the equivalent SINR in the decibel scale as if in rank 1 transmission, and the vertical axis represents the normalized efficiency in bps/Hz. The curve 701 is for rank 1 transmission. The curve 702 is for rank 2 transmission with an inter-layer interference of 0 dB, i.e., no inter-layer interference and good channel quality. The curve 703 is for rank 2 transmission with an inter-layer interference of 3 dB, i.e., medium channel quality, and the curve 704 is for rank 2 transmission with an inter-layer interference of 7 dB, i.e., poor channel quality.

From the simulation graph, it can be understood that, for a same CQM, the transmission which can achieve a higher efficiency is selected between rank 1 transmission and rank 2 transmission in case of different level of inter-layer interference. Further, in order to avoid over-frequent mode switching, hysteresis is applied. For example, two thresholds ($\beta1$ and $\beta2$), instead of one threshold, are used.

Thus, for inter-layer interference level of 0 dB, i.e., perfect isolation between layers, the set of parameters can be give as $\{\mu=0, \beta_2=-1, \beta_1=2\}$. For inter-layer interference level of 3 dB, i.e., moderate inter-layer interference, the set of parameters can be give as $\{\mu=1, \beta_2=5, \beta_1=12\}$. For inter-layer interference level of 7 dB, i.e., large inter-layer interference, the set of parameters can be give as $\{\mu=7, \beta_2=17, \beta_1=18.5\}$.

In such embodiment, the set of parameters can be updated according to the following logic:

```
if μ=3
    if ρ(n) > 3
        {μ=7, β_2=17, β_1=18.5}
    if ρ(n) < −2
        {μ=0, β_2=−1, β_1=2}
if μ=0 and ρ(n) > 2
    {μ=3, β_2=5, β_1=12}
if μ=7 and ρ(n) < −3
    {μ=3, β_2=5, β_1=12}.
```

Figure 8:
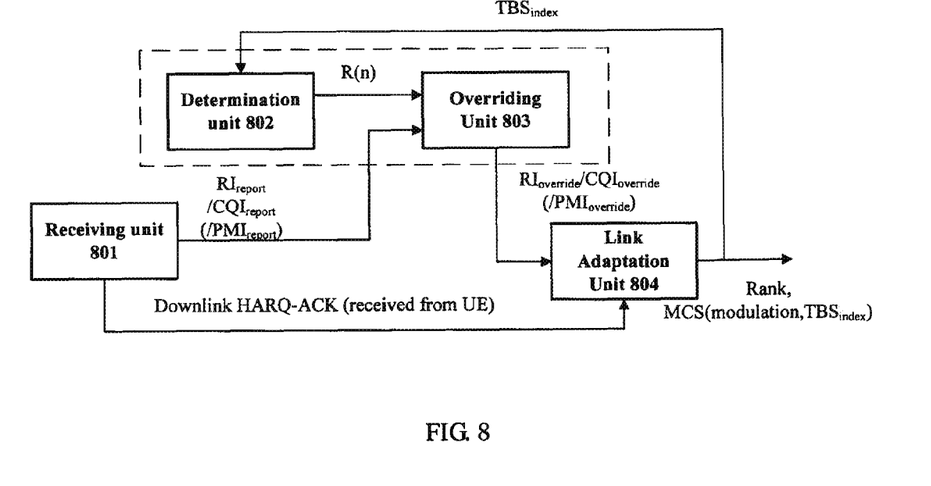
FIG. 8 illustrates a schematic block diagram of an apparatus for rank override in an eNB according to embodiments of the present invention.

FIG. 8 illustrates a schematic block diagram of an apparatus for rank override in an eNB according to embodiments of the present invention.

As shown in FIG. 8, there are a receiving unit 801, a determination unit 802, an overriding unit 803, and a link adaptation unit 804.

The receiving unit 801 may be configured to receive various information transmitted from the UE. For example, the receiving unit 801 can receive channel state information reported by the UE, such as RI, CQI, PMI, etc. Further, for outer-loop link adaptation, the receiving unit 801 can also receive downlink HARQ-ACK sent from the UE.

The determination unit 802 may be configured to determine a rank at least partly based on a TBS index generated from the link adaptation unit 804.

The overriding unit 803 may be configured to override the reported rank $RI_{report}$ with the rank R(n) determined by the determination unit 802. Then, the overridden rank $RI_{override}$ can be feed to the link adaptation unit 804. In some further embodiments, the overriding unit 803 may be further configured to override the CQI and PMI reported by the UE depending on a transmission mode in operation. Detailed description of the determination unit 802 and the overriding unit 803 will be given with reference to FIG. 9.

The link adaptation unit 804 may be configured to perform outer-loop link adaptation based on downlink HARQ-ACK received from the UE. After link adaptation (i.e., CQI adjustment), the link adaptation unit 804 output the overridden rank and the selected MCS which can better reflects the UE experienced radio link quality on PDSCH reception. The detailed link adaptation process is very known in the art, and thus the detailed description thereof is omitted here.

Figure 9:
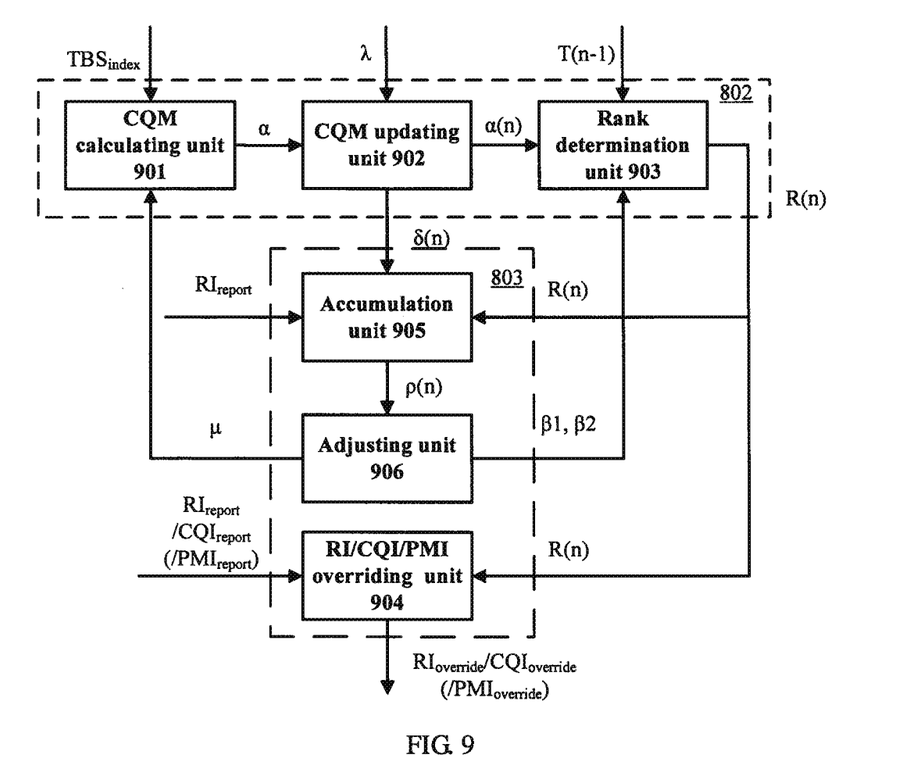
FIG. 9 illustrates a detailed block diagram of the determination unit 802 and the overriding unit 803 in FIG. 8 according to embodiments of the present invention.

FIG. 9 illustrates a detailed block diagram of the determination unit 802 and the overriding unit 803 in FIG. 8 according to embodiments of the present invention.

As shown in FIG. 9, the determination unit 802 may comprise a CQM calculating unit 901, a CQM updating unit 902, and a rank determination unit 903.

The CQM calculating unit 901 may be configured to calculate the CQM a for a current sub-frame n, at least partly based on the TBS index. In one embodiment, the CQM, denoted by $\alpha$, is the equivalent SINR in the decibel scale as if in rank 1 transmission. The CQM can be derived from the previous discovered mappings between $TBS_{idx}$ and SINR (or $SINR_{db}$). The calculation of CQM can reference to the previous description with respect to FIG. 4.

The CQM updating unit 902 may be configured to update a CQM of the MIMO transmission with the calculated CQM $\alpha$ by the CQM calculating unit 901. For example, the CQM may be updated as: $\alpha(n)=(1-\lambda)*\alpha(n-1)+\lambda*\alpha$.

The updated CQM may be stored periodically for each sub-frame in a storage device (not shown). In some further embodiments, the difference $\delta(n)$ of stored CQM between two consecutive sub-frames is also calculated. The difference may be used to monitor the effect of the rank override at the eNB, as described with respect to steps S302d-S302e in FIG. 4.

The rank determination unit 903 may be configured to determine the rank based on the updated CQM $\alpha(n-1)$ outputted from the CQM updating unit 902. To prevent overfrequent or ping-pong switching in rank determination, two thresholds, an upper threshold $\oplus 1$ and a lower threshold $\beta 2$, and a timer T, e.g., a countdown counter, are introduced to prevent over-frequent switching in rank determination.

Specifically, if the updated CQM is higher than a first threshold (i.e., the upper threshold $\beta 1$), the rank determination unit 903 determines the rank as a higher rank than a present one, and if the updated CQM is lower than a second threshold (i.e., the lower threshold $\beta 2$), the rank determination unit 903 determines the rank as a lower rank than the present one.

Additionally or alternatively, before changing the rank (i.e., determining as a higher one or a lower one), the rank determination unit 903 is further configured to determine whether a predefined time period has expired. If the time period has expired, then the rank determination unit 903 changes the rank; otherwise, not change the rank.

The detailed logic for the rank determination unit 903 to determine the rank may refer to FIG. 5, and the description thereof is omitted here.

As shown, the overriding unit 803 may comprise a RI/CQI/PMI overriding unit 904, an accumulation unit 905, and an adjusting unit 906.

The RI/CQI/PMI overriding unit 904 may be configured to override the reported RI with the determined RI, and override the reported CQI and/or PMI depending on the transmission mode in operation. The detailed logic for overriding RI/CQI/PMI may refer to FIG. 6, and the description thereof is omitted here.

During the overriding of the rank, the effect of rank override is closely monitored. Specifically, the accumulation unit 905 is configured to accumulate CQM variation $\rho(n)$ during the period of rank override. The accumulation unit 905 receives the difference of CQM between two consecutive sub-frames as calculated by the CQM updating unit 902, and accumulates the variation based on the inconsistence of the reported rank and the determined rank.

Then, the accumulated variation $\rho(n)$ can be fed to the adjusting unit 906. In the adjusting unit 906, parameters associated with inter-layer interference can be updated by comparing the accumulated variation $\rho(n)$ with some certain thresholds. The parameters may comprise the inter-layer interference factor $\mu$, the first/upper threshold $\beta 1$ and the second/lower threshold $\beta 2$ for determining the rank by the rank determination unit 903. Those updated parameters are then fed to the CQM calculating unit 901 and the rank determination unit 903. Through this way, the inter-layer interference can converge to a correct value.

From the above description, it can be understood that the proposed rank override eliminates the errors in reported RI from UE. Further, from the block diagram in FIGS. 8-9, it is clear that the proposed rank override only relies on existing information (i.e., $TBS_{index}$) available at the eNB and does not require any change in the standard or any additional signaling support from the UE.

Figure 10:
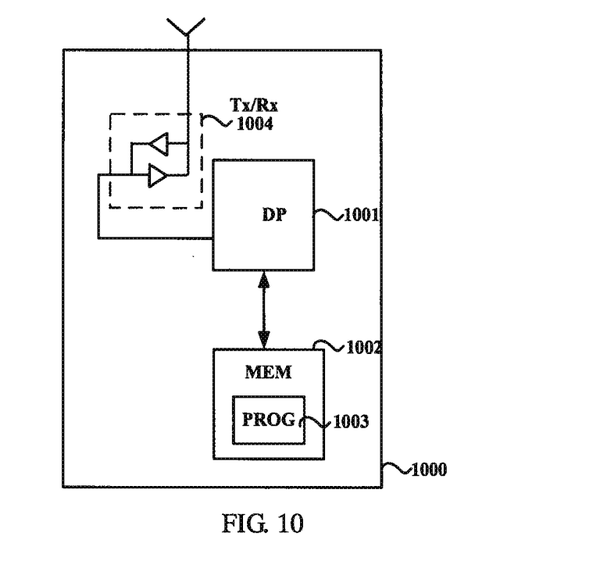
FIG. 10 illustrates a simplified block diagram of an entity that is suitable for use in practicing exemplary embodiments of the present invention.

FIG. 10 illustrates a simplified block diagram of an entity that is suitable for use in practicing exemplary embodiments of the present invention. The entity 1000 may be an entity at the network side, for example, a base station (BS), an enhanced Node B (eNB), a Node B, a radio access unit, or a base station controller.

As shown in FIG. 10, the entity 1000 includes a data processor (DP) 1001, a memory (MEM) 1002 coupled to the DP 1001, and a suitable RF transmitter TX and receiver RX 1004 coupled to the DP 1001. The MEM 1002 stores a program (PROG) 1003. The TX/RX 1004 is for bidirectional wireless communications. Note that, in embodiments of the present invention, the TX/RX 1004 has more than one antenna to facilitate communication. The entity 1000 may be coupled via a data path to one or more external networks or systems, such as the interne, for example.

The PROG 1003 is assumed to include program instructions that, when executed by the associated DP 1001, enable the entity 1000 to operate in accordance with the exemplary embodiments of this invention, as discussed herein with the flow chart in FIGS. 3-6. For example, the PROG 1003 and the DP 1001 may embody the determination unit 802 and the overriding unit 803 to perform the respective functions.

The embodiments of the present invention may be implemented by computer software executable by the DP 1001 of the entity 1000, or by hardware, or by a combination of software and hardware.

The MEM 1002 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the entity 1000, there may be several physically distinct memory units in the entity 1000. The DP 1001 may be of any type suitable to the local technical environment, and may include one or more of general purpose computers, special purpose computers, microprocessors, digital signal processors (DSPs) and processors based on multicore processor architecture, as non limiting examples. The entity 1000 may have multiple processors, such as for example an application specific integrated circuit chip that is slaved in time to a clock which synchronizes the main processor.

Exemplary embodiments of the present invention have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

The foregoing computer program instructions can be, for example, sub-routines and/or functions. A computer program product in one embodiment of the invention comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

The invention claimed is:

1. A method for use in a multiple-input multiple-output, MIMO, transmission, comprising:
   receiving, at a base station, a rank reported by a user equipment;
   determining, by the base station, a transmission block size index ($TBS_{idx}$) based on a link adaption decision;
   determining, by the base station, a rank at least partly based on said determined $TBS_{idx}$; and
   the base station overriding the reported rank with the determined rank, wherein
   determining the rank comprises:
      calculating a channel quality metric, CQM, for a current sub-frame, at least partly based on said TBS index;
      updating a CQM of the MIMO transmission with the calculated CQM; and
      determining the rank based on the updated CQM, wherein determining the rank based on the updated CQM comprises: determining the rank as a higher rank than a present one if the updated CQM is higher than a first threshold; and determining the rank as a lower rank than the present one if the updated COM is lower than a second threshold,
   calculating the CQM for the current sub-frame is further based on an inter-layer interference factor when the MIMO transmission is scheduled with a rank of more than 1, and
   the method further comprises: accumulating CQM variation during the overriding of the rank; and adjusting said inter-layer interference factor, said first threshold and said second threshold based on the accumulated CQM variation.

2. The method of claim 1, wherein determining the rank based on the updated CQM further comprises:
   determining whether a predefined time period has expired before changing the rank.

3. The method of claim 1, further comprising:
   overriding a reported channel quality indicator and a reported precoding matrix indicator, depending on a transmission mode in operation.

4. A base station apparatus for use in a multiple-input multiple-output, MIMO, transmission, the base station apparatus comprising:
   a receiver for receiving a rank reported by a user equipment; and
   a processor configured to: i) determine a transmission block size index ($TBS_{idx}$) based on a link adaption decision, ii) determine a rank at least partly based on the determined $TBS_{idx}$, and iii) override the reported rank with the determined rank, wherein the processor is further configured to:
   calculate a channel quality metric, CQM, for a current sub-frame, at least partly based on said TBS index, the CQM indicating an equivalent channel quality as if in rank 1 transmission;
   update a CQM of the MIMO transmission with the calculated CQM; and
   determine the rank based on the updated CQM by determining the rank as a higher rank than a present one if the updated CQM is higher than a first threshold; and determining the rank as a lower rank than the present one if the updated CQM is lower than a second threshold, wherein
   the processor is further configured to calculate the CQM for the current sub-frame further based on an inter-layer interference factor when the MIMO transmission is scheduled with a rank of more than 1, and
   the processor is further configured to;
   accumulate CQM variation during the overriding of the rank; and
   adjust said inter-layer interference factor, said first threshold and said second threshold based on the accumulated CQM variation.

5. The apparatus of claim 4, wherein the processor is further configured to determine whether a predefined time period has expired before changing the rank.

6. The apparatus of claim 4, wherein the processor is further configured to override a reported channel quality indicator and a reported precoding matrix indicator, depending on a transmission mode in operation.

7. A non-transitory computer-readable storage media having computer program code stored thereon, the computer program code configured to, when executed, cause an apparatus to perform actions in the method according to claim 1.

8. The method of claim 1, wherein receiving the rank comprises receiving a Rank Indicator (RI).

9. The method of claim 1, wherein determining the rank comprises:
   calculating a first quality metric ($\alpha$) for a current sub-frame using said TBS index ($TBS_{idx}$);
   calculating a second quality metric ($\alpha(n)$) using a; and
   determining the rank based on $\alpha(n)$.

10. The method of claim 9, wherein calculating a using $TBS_{idx}$, comprises the base station subtracting a predetermined value from $TBS_{idx}$.

11. The method of claim 10, wherein $\alpha = TBS_{idx} - 6$.

12. The method of claim/i wherein calculating $\alpha(n)$ comprises calculating $(1-\lambda)*\alpha(n-1)+\lambda*\alpha$, wherein $0<\lambda<1$, and $\alpha(n-1)$ is previously determined quality metric.

* * * * *

UNITED STATES PATENT AND TRADEMARK OFFICE
CERTIFICATE OF CORRECTION

PATENT NO. : 9,252,856 B2  
APPLICATION NO. : 13/988415  
DATED : February 2, 2016  
INVENTOR(S) : Wang Page 1 of 1

It is certified that error appears in the above-identified patent and that said Letters Patent is hereby corrected as shown below:

On the Title Page, in item (56), under "OTHER PUBLICATIONS", in Column 2, Line 1, delete "Seach" and insert -- Search --, therefor.

In the Specification

In Column 6, Line 44, delete "$0<\lambda 1.$" and insert -- $0<\lambda<1.$ --, therefor.

In Column 10, Line 30, delete "$\{\mu=1,$" and insert -- $\{\mu=3,$ --, therefor.

In Column 11, Line 18, delete "a for" and insert -- $\alpha$ for --, therefor.

In Column 11, Line 40, delete "⊕1" and insert -- $\beta 1$ --, therefor.

In Column 12, Line 42, delete "interne," and insert -- internet, --, therefor.

In the Claims

In Column 14, Line 13, in Claim 1, delete "COM" and insert -- CQM --, therefor.

In Column 14, Line 46, in Claim 4, delete "transmission:" and insert -- transmission; --, therefor.

In Column 14, Line 59, in Claim 4, delete "to;" and insert -- to: --, therefor.

In Column 15, Line 15, in Claim 9, delete "using a;" and insert -- using $\alpha$; --, therefor.

In Column 15, Line 17, in Claim 10, delete "a using" and insert -- $\alpha$ using --, therefor.

In Column 15, Line 21, in Claim 12, delete "claim/i" and insert -- claim 9 --, therefor.

Signed and Sealed this  
Sixteenth Day of August, 2016

Michelle K. Lee  
*Director of the United States Patent and Trademark Office*